United States Patent [19]

Chenevey et al.

[11] 3,865,876

[45] Feb. 11, 1975

[54] SYNTHESIS OF 3,3'-DIAMINOBENZIDINE FROM 3,3'-DICHLOROBENZIDINE

[75] Inventors: Edward C. Chenevey, North Plainfield; Melvin L. Druin, West Orange, both of N.J.; Kenneth Oringer, Westport, Conn.

[73] Assignee: Celanese Corporation, New York, N.Y.

[22] Filed: Oct. 21, 1969

[21] Appl. No.: 868,200

[52] U.S. Cl. ............................................... 260/581
[51] Int. Cl. ............................................ C07c 85/02
[58] Field of Search ........................... 260/581, 582

[56] References Cited
UNITED STATES PATENTS
3,230,266   1/1966   Baldoni et al...................... 260/581

*Primary Examiner*—Robert V. Hines

[57] ABSTRACT

A process for the synthesis of 3,3'-diaminobenzidine from 3,3'-dichlorobenzidine with $NH_3$ in the presence of a catalyst consisting essentially of cuprous chloride. This process produces higher yields of a purer product than prior processes employing catalysts which are a mixture of cuprous chloride and calcium chloride.

9 Claims, No Drawings

SYNTHESIS OF 3,3'-DIAMINOBENZIDINE FROM 3,3'-DICHLOROBENZIDINE

BACKGROUND OF THE INVENTION

A process for the synthesis of 3,3'-diaminobenzidine hereinafter DAB by reacting 3,3'-dichlorobenzidine hereinafter DCB in the presence of a catalyst constituting a mixture of cuprous chloride and calcium chloride is described in French Pat. No. 1,475,631 (1967). Unfortunately, the above-described catalyst results in undesirably low yields and undesirably impure DAB.

SUMMARY OF THE INVENTION

Accordingly, it is an object of the present invention to provide a novel process for the production of DAB from DCB which is substantially free of the disadvantages of the above and other prior processes.

Another object is to provide a novel process for the synthesis of DAB from DCB in higher yields than heretofore possible.

Yet another object is to provide a novel process for the synthesis of DAB of higher purity.

Additional objects and advantages of the present invention will be apparent to those skilled in the art by reference to the following detailed description thereof.

In accordance with the present invention it has been discovered that DAB in higher yields and greater purity can be synthesized from DCB and ammonia when the catalyst is substantially free of calcium chloride, i.e. when the catalyst consists essentially of cuprous chloride.

DESCRIPTION OF PREFERRED EMBODIMENTS

The process is conducted by reacting DCB with ammonia in the presence of a catalyst consisting essentially of cuprous chloride. The reacting is accomplished by contacting the reactants and the catalyst under any conditions that will form DAB and generally by charging these to a reaction zone in any suitable vessel such as an autoclave.

The temperature is not critical, the reaction being conducted at any temperature above which the reaction proceeds at an economic rate and below which undesirable competing reactions take place. Examples of undesirable competing reactions include thermal degradation of the reactants or products; hydrolysis of the DCB to an undesirable ammonium derivative and/or reaction of DCB with DAB to form undesirable secondary and tertiary amines. The temperature is generally between 100° and 500°C and preferably between 175° and 300°C. The pressure likewise is not critical however superambient pressures are preferred since they tend to drive the reaction to completion. The reaction pressure is generally between 10 and 10,000 psig and preferably between 500 and 2,500 psig. In a preferred embodiment of the present invention the reaction is conducted at autogenous pressure. The reaction is conducted until the desired amount of DCB has been converted to DAB. If it is desired that the reaction go to completion such can be determined by any convenient means such as melting point tests conducted on a differential scanning calorimeter or any other convenient means. Completion of the reaction is usually observed in 2 to 8 hours.

The molar ratio of cuprous chloride to DCB is not critical and it has been found that even small amounts of cuprous chloride catalyze the reaction. However, optimum results occur at molar ratios of 0.1:1.0 to 5:10 and preferably 1:10 to 3:10 moles cuprous chloride per mole DCB. In general higher molar ratios give faster conversion but tend to leave undesirable amounts of cuprous chloride in the DAB product.

By ammonia is meant any $NH_3$ releasing substance preferred examples of which include ammonium hydroxide, gaseous or liquid $NH_3$ and mixtures thereof such as aqua ammonia. The reaction is preferably conducted in the presence of some water supplied to the reaction zone as such or in the form of ammonium hydroxide. The $NH_3$ is preferably present in a stoichiometric excess over that necessary to completely convert DCB to DAB and is generally present in a molar ratio of 2:1 to 200:1 and preferably 10:1 to 60:1 and most preferably 15:1 to 30:1.

Since pure DAB contains a stoichiometric amount of nitrogen but no chlorine and no copper, the purity of the final product can be determined by elemental analysis for chlorine, nitrogen and/or copper. Chlorine can be present due to DCB, $NH_4Cl$, or from the catalyst. When DCB is present nitrogen analysis (Kjeldahl) is preferably used to establish purity assuming that the crude product is a binary mixture of DCB and DAB. The presence of copper is generally attributed to the catalyst. When no DCB is present purity can be determined by comparing the weight percent nitrogen in the sample with that theoretically present in pure DAB.

DAB is a known compound of well known utility and is useful as an intermediate in the synthesis of high temperature resistant polymers such as poly-2,2'-(m-phenylene)-5,5'-bibenzimidazole as described in U.S. Pat. NOs. 2,895,948 and 3,174,947. DAB is also useful as an antioxidant and as a curing agent for epoxy resins.

The invention is further illustrated by the following examples in which all parts and percentages are by weight unless otherwise indicated. These non-limiting examples are illustrative of certain embodiments designed to teach those skilled in the art how to practice the invention and to represent the best mode contemplated for carrying out the invention.

EXAMPLE 1

This example illustrates the process of the present invention using a $Cu_2Cl_2$ catalyst and an $NH_3:DCB$ ratio of 15:1.

An autoclave is charged with 532 gms. of DCB, 83.4 gms. $Cu_2Cl_2$ and 2000 ml. of ammonium hydroxide containing 30 weight percent $NH_3$ to form a slurry. The slurry is heated to and maintained at 225°C and 900 psig for a period of 4 hours. The crude reaction product is cooled, filtered, washed with water, dried and found to weigh 436 gms. of which 372 gms. are DAB corresponding to a yield of 82.4 percent of theory. The purity of the crude product is 85.3 percent.

The purity is calculated by the formula:

$$\text{purity} = (N)/(26.17)\ 100$$

wherein N is the weight percent of elemental nitrogen in the sample determined for example by the Kjeldahl method.

EXAMPLE 2

This example illustrates the process of the present invention using a $Cu_2Cl_2$ catalyst and an $NH_3:DCB$ ratio of 30:1.

An autoclave is charged with 332 gms. of DCB, 52 gms. of Cu₂Cl₂ and 2,500 ml. of ammonium hydroxide containing 30 weight percent NH₃ to form a slurry. The slurry is heated to and maintained at 225°C and 1,100 psig for a period of 4 hours. The crude reaction product is cooled, filtered, washed with water, dried and found to weigh 243 gms. of which 212 gms. are DAB corresponding to a yield of 75.4 percent of theory. The purity of this crude product is 87.2 percent.

EXAMPLE 3

This comparative example illustrates the lower yields and lower purity of DAB produced by the use of catalysts of Cu₂Cl₂ and CaCl₂.

An autoclave is charged with 290 gms. of DCB, 45.4 gms. of Cu₂Cl₂, 144 gms. of CaCl₂ and 2,250 ml. of ammonium hydroxide containing 28.8 weight percent NH₃ to form a slurry. The slurry is heated to and maintained at 225°C and 1,100 psig for a period of 4 hours. The crude reaction product is cooled, filtered, washed with water, dried and found to weigh 202 gms. of which 166 gms. are DAB corresponding to a yield of 67.4 percent of theory. The purity of this crude product is 82 percent.

Although the invention has been described in considerable detail with reference to certain preferred embodiments thereof, it will be understood that variations and modifications can be effected within the spirit and scope of the invention as described above and as defined in the appended claims.

What is claimed:

1. A process for the synthesis of 3,3'-diaminobenzidene from 3,3'-dichlorobenzidine consisting essentially of reacting 3,3'-dichlorobenzidine with NH₃ in the presence of water and a catalyst consisting essentially of cuprous chloride.

2. The process of claim 1 wherein the reaction is conducted at 175° to 300°C. and autogenous pressure.

3. A process for the synthesis of 3,3'-diaminobenzidine from 3,3'-dichlorobenzidine consisting essentially of reacting 3,3'-diaminobenzidine with NH₃ at 100° to 500°C. 500°a pressure of 10 to 10,000 psig in the presence of water and a catalyst consisting essentially of cuprous chloride; wherein the molar ratio of cuprous chloride to 3,3'-dichlorobenzidine is 0.1:10 to 5:10; wherein the molar ratio of NH₃ to 3,3'-dichlorobenzidine is 2:1 to 200:1.

4. The process of claim 3 wherein the reaction is conducted at a temperature of 175° to 300°C.

5. The process of claim 3 wherein the ammonia is NH₃ present as such.

6. The process of claim 3 wherein the NH₃ is present at least in part as ammonium hydroxide.

7. The process of claim 3 wherein the molar ratio of cuprous chloride to 3,3'-dichlorobenzidine is 1:10 to 3:10.

8. The process of claim 3 wherein the molar ratio of NH₃ to 3,3'-dichlorobenzidine is 10:1 to 60:1.

9. A process for the synthesis of 3,3'-diaminobenzidine from 3,3'-dichlorobenzidine consisting essentially of reacting 3,3'-diaminobenzidine with NH₃ at 175° to 300°C. and autogenous pressure in the presence of water and a catalyst consisting essentially of cuprous chloride; wherein the molar ratio of cuprous chloride to 3,3'-dichlorobenzidine is 1:10 to 3:10; and wherein the molar ratio of NH₃ to 3,3'-dichlorobenzidine is 15:1 to 30:1.

* * * * *